(12) United States Patent
Gustafsson et al.

(10) Patent No.: US 8,665,286 B2
(45) Date of Patent: Mar. 4, 2014

(54) COMPOSITION OF DIGITAL IMAGES FOR PERCEPTIBILITY THEREOF

(75) Inventors: Harald Gustafsson, Lund (SE); Jan Patrik Persson, Lund (SE); Per Persson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 537 days.

(21) Appl. No.: 12/855,051

(22) Filed: Aug. 12, 2010

(65) Prior Publication Data

US 2012/0038658 A1    Feb. 16, 2012

(51) Int. Cl.
*G09G 5/00*    (2006.01)
*G09G 5/02*    (2006.01)
*H04N 11/00*   (2006.01)
*H04N 5/46*    (2006.01)
*H04N 5/445*   (2011.01)
*H04N 9/64*    (2006.01)
*H04N 9/12*    (2006.01)
*H04N 1/40*    (2006.01)
*H04N 1/46*    (2006.01)
*G03F 3/08*    (2006.01)
*G06K 9/40*    (2006.01)
*G06K 9/00*    (2006.01)

(52) U.S. Cl.
USPC ........... 345/589; 345/617; 345/619; 345/630; 345/207; 345/690; 348/552; 348/557; 348/563; 348/702; 348/739; 358/518; 358/540; 358/448; 382/167; 382/254; 382/274

(58) Field of Classification Search
USPC ................ 345/418, 426–428, 581, 589–593, 345/597–600, 606, 617–619, 629–630, 207, 345/690, 694, 697, 1.2, 48, 63, 77; 348/552–553, 557, 563–564, 602, 673, 348/702, 739; 358/509–510, 517–518, 538, 358/540, 447–448, 461, 453, 463; 382/82–284, 311–312

See application file for complete search history.

(56) References Cited

U.S. PATENT DOCUMENTS 5,625,493 A    4/1997  Matsumura et al.
5,825,456 A   10/1998  Tabata et al.
(Continued)

FOREIGN PATENT DOCUMENTS

EP    1231501 A2    8/2002
EP    1365597 A2   11/2003
(Continued)

OTHER PUBLICATIONS

Son, C.-H. et al. "Color Correction of Projected Image on Color-Screen for Mobile Beam-Projector." Color Imaging XIII: Processing, Hardcopy, and Applications, Proceedings vol. 6807, Jan. 28, 2008.

(Continued)

*Primary Examiner* — Wesner Sajous
(74) *Attorney, Agent, or Firm* — Coats & Bennett, PLLC

(57) ABSTRACT

Teachings herein compose a digital image so that the image is perceptible on a viewing surface, such as a projection surface or a transparent screen. In doing so, the teachings advantageously recognize a digital image as consisting of one or more logical objects, like buttons of a user interface. Often, logical objects may be spatially arranged within the image and/or colored in different possible ways without substantially affecting the meaning conveyed by the image. Exploiting this, teachings herein evaluate light reflected from, or transmitted through, the viewing surface, and compose the digital image from one or more logical objects that have a spatial arrangement or coloration determined in dependence on that evaluation. The teachings might, for example, place a logical object within the image so that it will be displayed on a region of the surface which has high contrast with the object's colors and/or low color variance.

24 Claims, 12 Drawing Sheets

(56) References Cited

U.S. PATENT DOCUMENTS

| | | | |
|---|---|---|---|
| 6,037,914 | A | 3/2000 | Robinson |
| 6,481,851 | B1 | 11/2002 | McNelley et al. |
| 6,971,575 | B2 * | 12/2005 | Tsikos et al. ............. 235/462.01 |
| 7,184,054 | B2 | 2/2007 | Clark |
| 7,477,140 | B1 * | 1/2009 | Booth et al. ................... 340/471 |
| 8,212,744 | B2 * | 7/2012 | Kuo et al. ........................... 345/8 |
| 8,397,181 | B2 * | 3/2013 | Hartman et al. .............. 715/848 |
| 2002/0041287 | A1 * | 4/2002 | Engeldrum et al. ........... 345/589 |
| 2002/0154142 | A1 * | 10/2002 | Thomason ..................... 345/629 |
| 2004/0008267 | A1 * | 1/2004 | Chen et al. ................. 348/229.1 |
| 2004/0201586 | A1 * | 10/2004 | Marschner et al. ............ 345/426 |
| 2005/0041009 | A1 * | 2/2005 | Kuroda ........................... 345/102 |
| 2005/0264545 | A1 * | 12/2005 | Walker ............................ 345/204 |
| 2006/0044286 | A1 | 3/2006 | Kohlhaas et al. |
| 2006/0152618 | A1 * | 7/2006 | Yamasaki ...................... 348/345 |
| 2008/0013057 | A1 | 1/2008 | Bullock |
| 2008/0018555 | A1 * | 1/2008 | Kuo et al. ........................... 345/8 |
| 2008/0095468 | A1 | 4/2008 | Klemmer et al. |
| 2008/0240335 | A1 | 10/2008 | Manjeshwar et al. |
| 2008/0259289 | A1 * | 10/2008 | Nozaki et al. .................... 353/70 |
| 2009/0015831 | A1 * | 1/2009 | Yguerabide et al. .......... 356/337 |
| 2009/0142001 | A1 | 6/2009 | Kuniyuki |
| 2009/0236971 | A1 | 9/2009 | Kuo et al. |
| 2010/0110385 | A1 | 5/2010 | Choi et al. |
| 2010/0208033 | A1 | 8/2010 | Edge et al. |
| 2010/0321409 | A1 | 12/2010 | Komori et al. |
| 2011/0157155 | A1 | 6/2011 | Turner et al. |
| 2011/0164294 | A1 | 7/2011 | Shimizu |

FOREIGN PATENT DOCUMENTS

| | | |
|---|---|---|
| WO | 03/005733 A1 | 1/2003 |
| WO | 2008/155771 A2 | 12/2008 |
| WO | 2009/049272 A2 | 4/2009 |
| WO | 2009/126258 A1 | 10/2009 |

OTHER PUBLICATIONS

Author Unknown. "Media Advisory: Samsung Mobile Display Unveils Next-generation OLED Displays at CES 2010: Digital Experience!" Samsung news release, Las Vegas, NV, US, Jan. 7, 2010. Available at: http://www.samsung.com/us/business/semiconductor/newsView.do?news_id=1118.

Flatley, J. L. "Samsung's 14-inch Transparent OLED Laptop (video)." Jan. 7, 2010. Available at: http://www.engadget.com/2010/01/07/samsungs-14-inch-transparent-oled-laptop-video/.

* cited by examiner

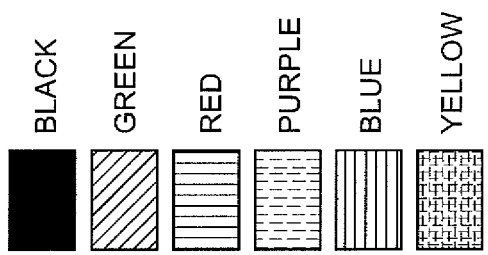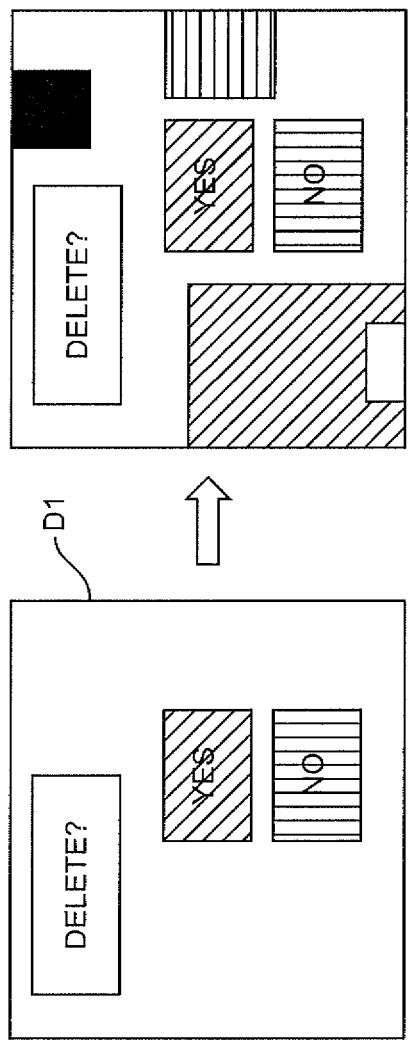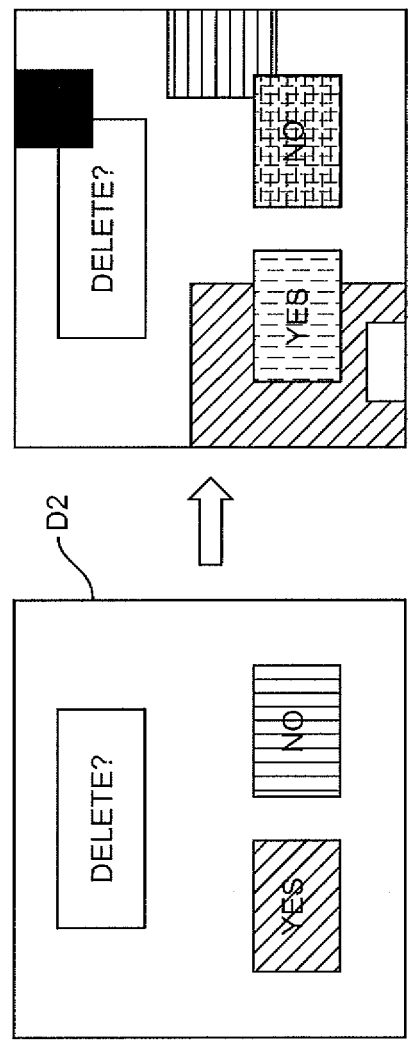
FIG. 2D
FIG. 2E

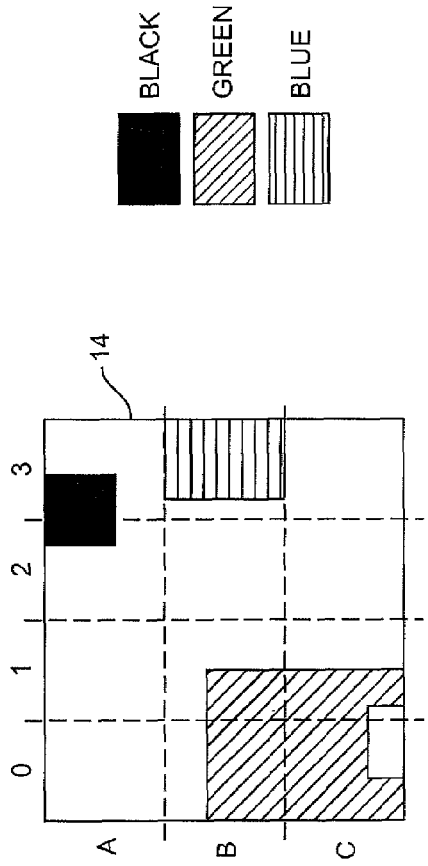
FIG. 5A
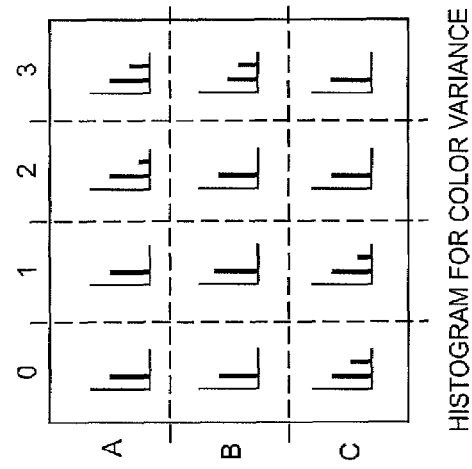
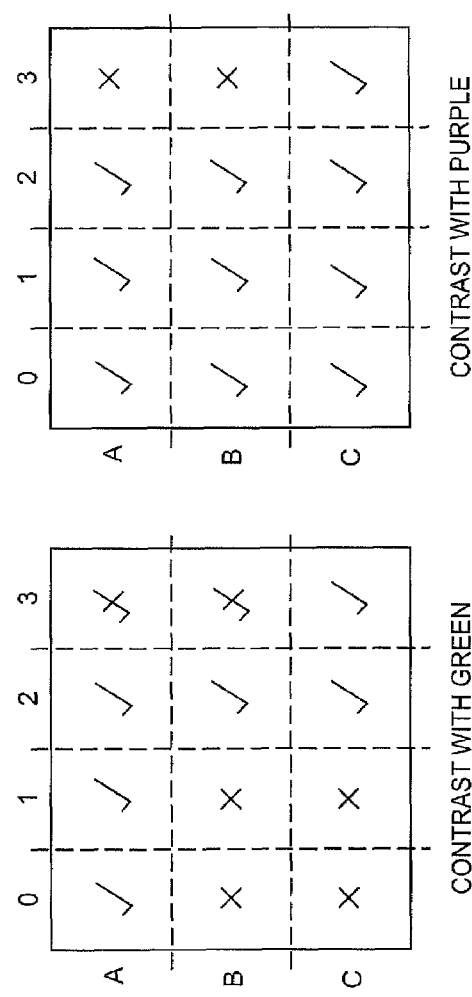
FIG. 5B
FIG. 5C
FIG. 5D

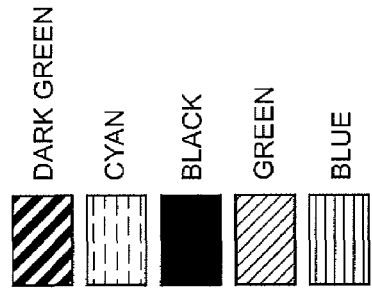
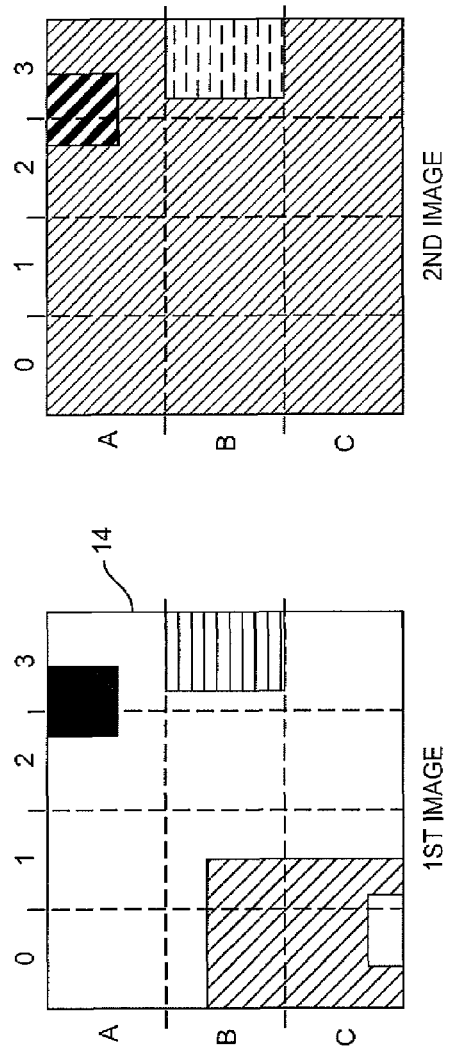
FIG. 6A  
FIG. 6B  
FIG. 6C

COMPOSITION OF DIGITAL IMAGES FOR PERCEPTIBILITY THEREOF

TECHNICAL FIELD

The present invention relates generally to digital image composition, and particularly to composing a digital image from one or more logical objects to provide for the perceptibility of the image on a viewing surface.

BACKGROUND

Advances in display technology have greatly enhanced the accessibility of digital information. The size of projector systems, for example, has significantly decreased, making them valuable accessories to even mobile devices, e.g., mobile communication devices. In this regard, a user of a mobile device can project a digital image from the device onto almost any surface, like a nearby wall, the palm of his or her hand, or any substantially opaque surface suitable as a projection surface. Projection conveniently magnifies the image for viewing, as compared to viewing the image on the device itself.

As another example, heads-up displays (HUDs) are becoming more prominent display accessories for military and commercial aviation, automobiles, gaming, and the like. HUDs display a digital image on a transparent screen placed in front of a user. From the perspective of the user, then, HUDs superimpose the digital image onto the surface(s) behind the screen. This allows the user to more quickly, more easily, and more safely view the image without looking away from his or her desired viewpoint. For instance, with such technology a driver of an automobile can view navigational instructions or speed information without taking his or her eyes off the road, a fighter pilot can view target information or weapon status information without taking his or her eyes off of the target, and so on. And although for perhaps less practical advantages than these, some computer laptops, mobile communication devices, and other such mobile devices are now equipped with transparent screens as well.

The fact that these display technologies make it possible to conveniently project or superimpose a digital image onto almost any surface is of course one of their advantages. However, that fact also creates a practical challenge. Because a digital image can be projected or superimposed onto almost any surface, all or parts of the digital image may sometimes be difficult for a user to perceive. Consider, for example, a digital image that includes green text. If the surface onto which the digital image is projected or superimposed is a green surface (e.g., a green wall or a patch of green trees), the green text will be much more difficult for the user to perceive than if the surface had instead been a purple surface (e.g., a purple wall or a patch of purple flowers).

Of course in many cases a user cannot practically change the surface(s) onto which he or she projects or superimposes a digital image, to achieve better perceptibility. In the case of an automobile heads-up display, for instance, such would require changing the direction of the entire automobile. Moreover, even in those cases where it may indeed be practical, surface(s) that offer better perceptibility may nevertheless be unavailable.

SUMMARY

Teachings herein compose a digital image so that the image is perceptible on a viewing surface, such as a projection surface or a transparent screen. The teachings advantageously recognize a digital image as consisting of one or more logical objects (e.g., buttons of a user interface) that often may be spatially arranged and/or colored in different possible ways without substantially affecting the meaning conveyed by the image. In one sense, then, the teachings exploit this fact by spatially arranging and/or coloring the logical objects of a digital image so that, according to an automated evaluation of the viewing surface, those objects are perceptible on the viewing surface.

Various embodiments, for example, include a method of composing a digital image to provide for perceptibility of the image on a viewing surface. The method includes evaluating light reflected from, or transmitted through, the viewing surface. This evaluation may entail obtaining an image of the viewing surface itself (e.g., if the viewing surface is a projection surface) or obtaining an image of whatever is visible to a user through the viewing surface (e.g., if the viewing surface is a transparent screen). In either case, the method further includes composing the digital image from one or more logical objects that have a spatial arrangement or coloration determined in dependence on the evaluation. The method finally includes outputting the composed digital image as digital data for display on the viewing surface.

In some embodiments, composition of the digital image includes assessing the perceptibility of the one or more logical objects for different possible spatial arrangements or colorations of those objects, based on evaluation of the viewing surface, and then determining the spatial arrangement or coloration of the objects as the arrangement or coloration that maximizes the objects' perceptibility (or meets some other criteria for the objects' perceptibility). Accordingly, with the digital image composed in this way, the perceptibility of the image's logical object(s) may be enhanced, as compared to other possible spatial arrangements or colorations of the object(s), without substantially affecting the meaning of the digital image.

Evaluation of the light reflected from, or transmitted through, the viewing surface in some embodiments is performed on a region-by-region basis. That is, the viewing surface is conceptually divided into different regions and then evaluation is performed separately in each region. Evaluation may entail, for instance, determining, for each individual region, the extent to which the region contrasts with one or more different colors, and/or the color variance in the region. Composition of the digital image may then include placing logical objects within the image based on this determination, so that any given logical object will be displayed on a region of the viewing surface which has higher contrast with one or more colors of the logical object than another region and/or lower color variance than another region. Composition may alternatively or additionally include selecting one or more colors for a logical object that have higher contrast with a region of the viewing surface onto which the logical object will be displayed than other possible colors.

A device configured to compose a digital image as described above includes, according to some embodiments, an image processor and a memory, and may further include or be connected to a detector, a display buffer, a display driver, or the viewing surface itself. The detector, which may be a camera, assists the image processor evaluate light reflected from, or transmitted through, the viewing surface, by directly or indirectly providing the processor with information about this light. Having received this information, the image processor evaluates that light and composes the digital image from one or more logical objects that have a spatial arrangement or coloration determined in dependence on the evaluation. With this image composed, the image processor sends the image to the display buffer. The display driver retrieves the digital image from the display buffer and displays the image on the viewing surface.

Of course, the present invention is not limited by the above features and advantages. Those of ordinary skill in the art will appreciate additional features and advantages upon reading the following detailed description of example embodiments, and reviewing the figures included therein.

BRIEF DESCRIPTION OF THE DRAWINGS

FIG. 2D illustrates an example of composing a digital image from one or more logical objects having a spatial arrangement determined in dependence on evaluation of the viewing surface, according to some embodiments of the present invention.

FIG. 2E illustrates an example of composing a digital image from one or more logical objects having a coloration determined in dependence on evaluation of the viewing surface, according to some embodiments of the present invention.

FIGS. 5A-5D illustrate an example of evaluating light reflected from, or transmitted through, a viewing surface on a region-by-region basis, according to some embodiments of the present invention.

FIGS. 6A-6C illustrate an example of obtaining and comparing two different images of light reflected from, or transmitted through, a viewing surface, according to some embodiments of the present invention.

FIGS. 7A-7E illustrate an example of dynamically evaluating light reflected from, or transmitted through, a viewing surface, according to some embodiments of the present invention.

DETAILED DESCRIPTION

Methods and apparatus herein compose a digital image so that the image is perceptible when viewed on a viewing surface, such as a projection surface or a transparent screen. In doing so, the methods and apparatus advantageously recognize a digital image as consisting of one or more logical objects. A logical object as used herein comprises a collection of logically related pixel values or geometrical primitives. Often, logical objects of a digital image may be spatially arranged within the image and/or colored in different possible ways without substantially affecting the meaning conveyed by the image.

For example, a digital image representing a user interface consists of various buttons, text boxes, and the like. Each of these is a logical object. As logical objects, the buttons and text boxes may not need not to be spatially arranged in any particular way within the digital image, or be colored any particular colors, in order for the digital image to serve as an effective user interface.

Figure 1:
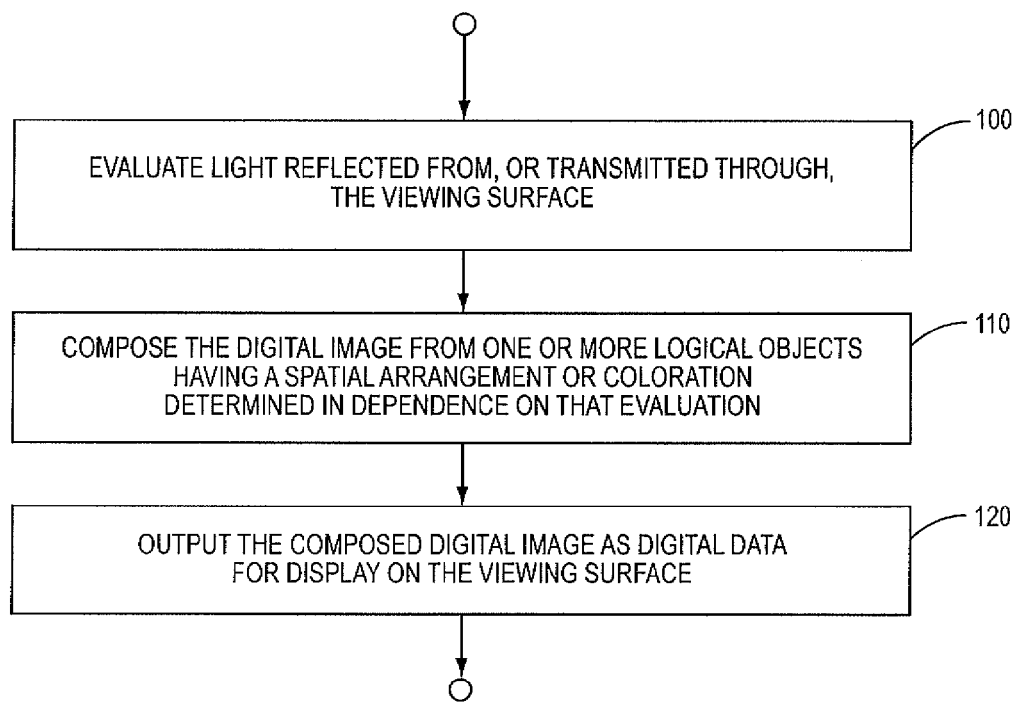
FIG. 1 is a logic flow diagram illustrating a method of composing a digital image to provide for perceptibility of that image on a viewing surface, according to some embodiments of the present invention.

Exploiting this property of logical objects, methods and apparatus herein compose the digital image so that the logical objects of the image are perceptible on the viewing surface. FIG. 1 illustrates one such method according to various embodiments. In FIG. 1, the method includes evaluating light reflected from, or transmitted through, the viewing surface (Block 100). Described in more detail below, this evaluation may entail obtaining an image of the viewing surface itself (e.g., if the viewing surface is a projection surface) or obtaining an image of whatever is visible to a user through the viewing surface (e.g., if the viewing surface is a transparent screen).

The method further includes composing the digital image from one or more logical objects that have a spatial arrangement or coloration determined in dependence on the evaluation (Block 110). In some embodiments, for example, this includes assessing the perceptibility of the one or more logical objects for different possible spatial arrangements or colorations of those objects, based on evaluation of the viewing surface, and then determining the spatial arrangement or coloration of the objects as the arrangement or coloration that maximizes the objects' perceptibility (or meets some other criteria for the objects' perceptibility). Accordingly, with the digital image composed in this way, the perceptibility of the image's logical object(s) may be enhanced, as compared to other possible spatial arrangements or colorations of the object(s), without substantially affecting the meaning of the digital image. The method finally includes outputting the composed digital image as digital data for display on the viewing surface (Block 120).

FIGS. 2A-2E provide a simple example of the above digital image composition. In this example, FIG. 2A graphically illustrates the light reflected from, or transmitted through, a viewing surface S. If the viewing surface S is a substantially opaque surface, for instance, such as the wall of a building or a piece of paper, substantially all visible light incident on that surface is either diffusely reflected or absorbed by the surface. Thus, the part of the surface S labeled "green" reflects green light while absorbing other visible light frequencies, and the part labeled "blue" reflects blue light while absorbing other visible light frequencies. Similarly, the part labeled "black" absorbs substantially all visible light frequencies, and the remaining part that is not explicitly labeled, the white part, reflects substantially all visible light frequencies.

On the other hand, if the viewing surface S is a substantially transparent screen, such as that of a heads-up display (HUD), substantially all visible light incident on a back face of the screen is transmitted through the screen to the front face (the face shown in the Figure). Thus, in this case, the green part of the surface transmits green light, the blue part transmits blue light, and so on.

Figure 2A:
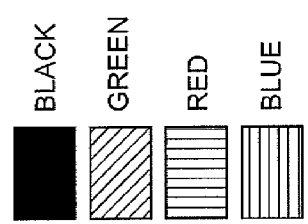
FIG. 2A illustrates an example of a viewing surface onto which a digital image is displayed, according to one embodiment of the present invention.
Figure 2A:
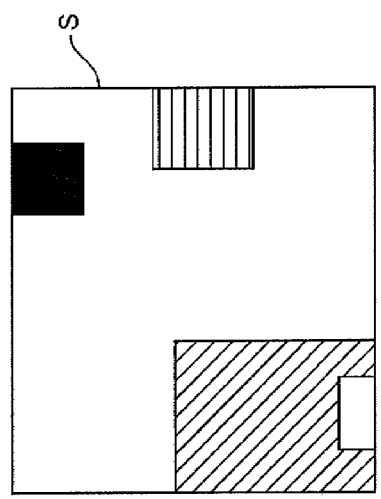
Figure 2B:
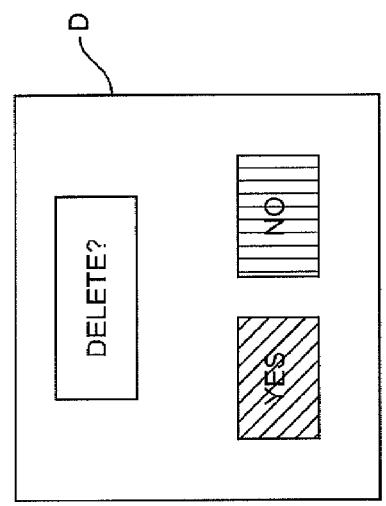
FIG. 2B illustrates an example of a digital image to be displayed, according to one embodiment of the present invention.
Figure 2C:
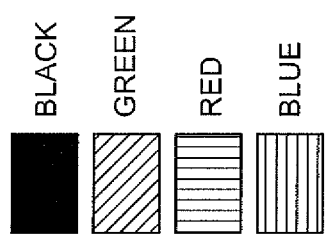
FIG. 2C illustrates the result of displaying the digital image of FIG. 2B on the viewing surface of FIG. 2A.
Figure 2C:
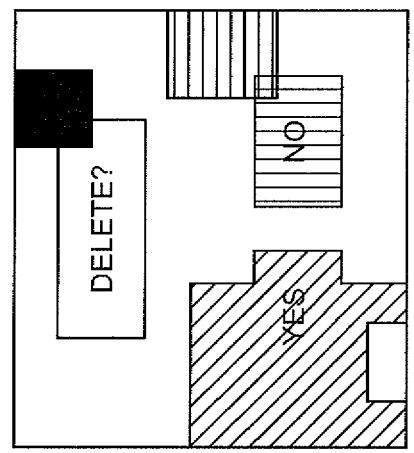

FIG. 2B illustrates an example of a digital image D to be displayed on the viewing surface S. The digital image D shown has been composed from various logical objects, including a "Delete?" text box, a YES button, and a NO button. As composed, however, these logical objects have a spatial arrangement and/or a coloration that makes it difficult for a user to perceive them on the viewing surface S. In particular, with the YES button green in color, the NO button red in color, and the two buttons having a horizontal spatial arrangement, FIG. 2C illustrates that the buttons are difficult to perceive on the viewing surface S. The green YES button is especially difficult to perceive. It is displayed on a region of the surface S that includes mostly the green part of the surface S. The green part of the surface S does not contrast with the green color of the button, making the green button difficult to perceive. The button is also difficult to perceive because it is displayed on a region of the surface that includes multiple different colors, both green and white. The red NO button is difficult to perceive for many of these same reasons.

By contrast, FIGS. 2D and 2E show examples of digital images D1 and D2 composed in accordance with the method in FIG. 1. In FIG. 2D, the digital image D1 is composed from logical objects that have a spatial arrangement determined in dependence on evaluation of light reflected from, or transmitted through, the viewing surface S. With the image D1 composed in this way, the green YES button and the red NO button have a vertical spatial arrangement, so that the buttons are displayed entirely on the white part of the surface S. By spatially arranging the buttons in this manner, the meaning of the digital image D1 remains substantially the same as that of the digital image D in FIG. 2B; indeed, it does not substantially matter whether the buttons are displayed to a user in a horizontal spatial arrangement or a vertical spatial arrangement. Yet because the buttons are displayed on the white part of the surface S, which has a higher contrast with the green color of the YES button and the red color of the NO button than either the green or blue part, the perceptibility of the buttons is enhanced as compared to FIG. 2B. The buttons' perceptibility is also enhanced because they are displayed on a region of the surface that includes only a single color, white, rather than multiple different colors.

In FIG. 2E, the digital image D2 is composed from logical objects that instead have a coloration determined in dependence on evaluation of light reflected from, or transmitted through, the viewing surface S. With the image D2 composed in this way, the YES button has a purple coloration and the NO button has a yellow coloration. By coloring the buttons in this manner, the meaning of the digital image D2 remains substantially the same as that of the digital image D in FIG. 2B; indeed, it does not substantially matter whether the buttons are displayed to a user as green and red buttons or as purple and yellow buttons. Yet because the buttons are displayed as purple and yellow buttons, which have a higher contrast with the green part and the blue part of the surface S on which the buttons are respectively displayed, the perceptibility of the buttons is enhanced as compared to FIG. 2B.

Figure 3:
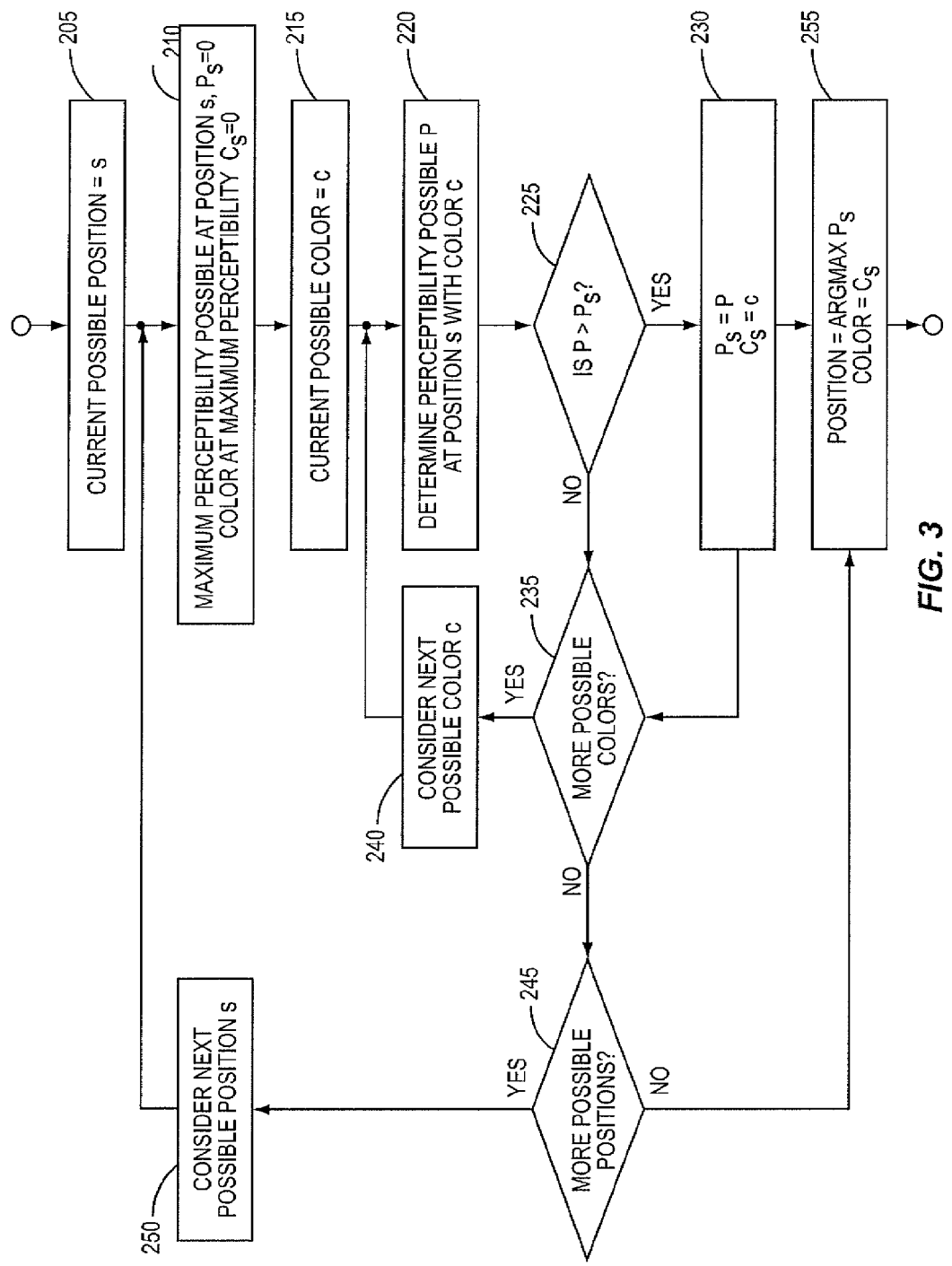
FIG. 3 is a logic flow diagram of a method of composing a digital image from one or more logical objects having both a spatial arrangement and a coloration determined in dependence on evaluation of light reflected from, or transmitted through, the viewing surface, according to some embodiments of the present invention.

Of course, while FIGS. 2D and 2E illustrated relatively simple embodiments where the logical objects of a digital image have either a spatial arrangement or a coloration determined in dependence on evaluation of the viewing surface, in other embodiments the logical objects may have both. That is, in some embodiments, composition of the digital image may entail assessing the perceptibility of a logical object for different possible spatial arrangements of that object, and for different possible colorations at those spatial arrangements, and then determining the spatial arrangement and coloration of the object as the combination that either maximizes the object's perceptibility or offers at least some pre-determined perceptibility. FIG. 3 illustrates one example method of embodiments that maximize the object's perceptibility.

In FIG. 3, composition of the digital image entails assessing the perceptibility of a logical object at different positions s in a set S of possible positions for that logical object, and at different colors c in a set C of possible colors for that object. In particular, for different positions s in the set S of possible positions (Blocks 205, 245, and 250), and for different colors c in the set C of possible colors (Blocks 215, 235, and 240), the method includes determining a perceptibility P for the object if placed at that position s and colored with that color c. (Block 220). The method further includes determining the position s and color c for the object that maximizes the object's perceptibility (Blocks 225, 230, and 255). The method finally includes placing the object at that position, and selecting that color for the object.

Note, of course, that the set S of possible positions for any given logical object may include all possible positions within the image 12 such that perceptibility is assessed over a full search of the image 12. In other embodiments, though, the set S of possible positions for a logical object just includes some possible positions within the image 12, such that perceptibility is assessed over only a partial search of the image 12. For example, the set S of possible positions may only include positions that are somehow previously known or estimated to offer good perceptibility. The same can be said for the set C of possible colors for a logical object.

Note also that, in other embodiments only offering some pre-determined perceptibility, the method may immediately assess whether a perceptibility just determined for a logical object meets that pre-determined perceptibility. Then, if so, the method places the object at that position and selects that color for the object, without continuing to determine the perceptibility of the object if placed at other positions or if colored with other colors. Such avoids superfluous processing once a position and color have been determined to offer the pre-determined perceptibility.

Figure 4:
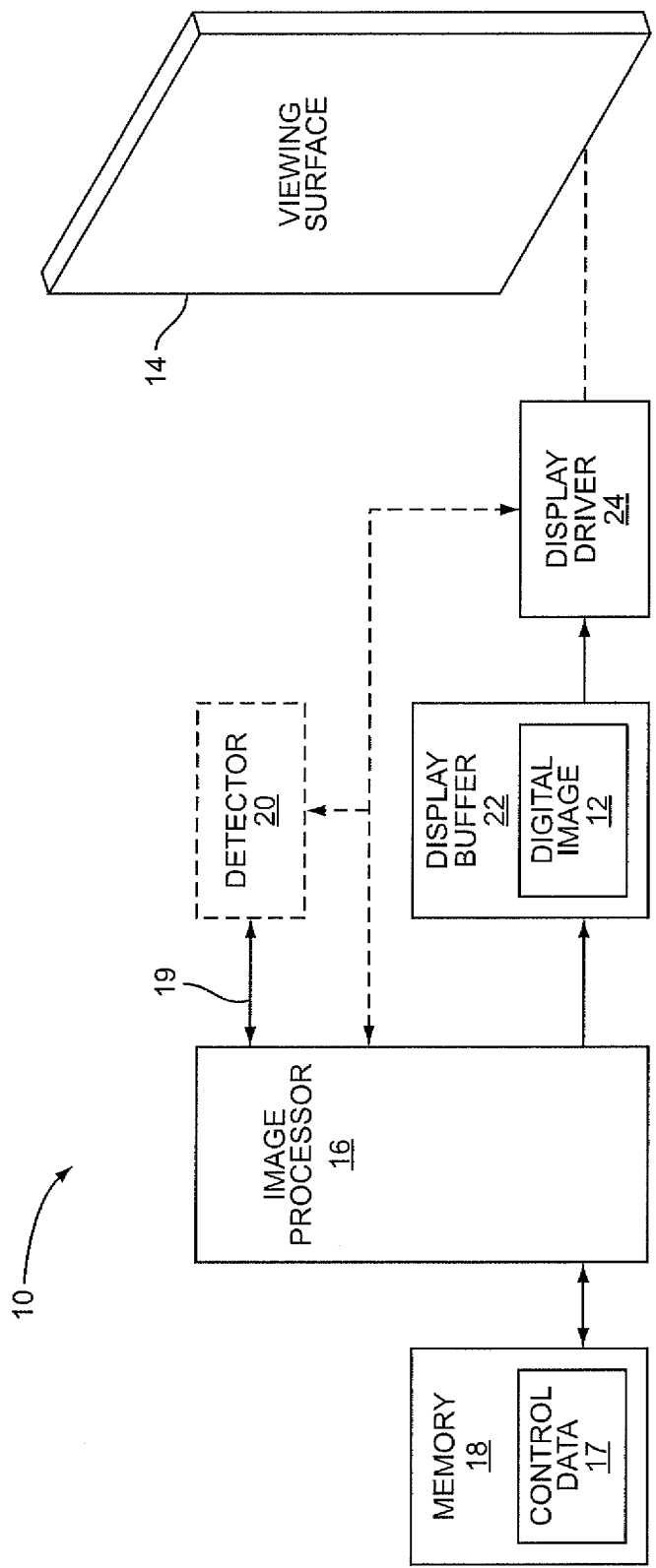
FIG. 4 is a block diagram of a device configured to compose a digital image to provide for perceptibility of that image on a viewing surface, according to some embodiments of the present invention.

FIG. 4 illustrates a device 10 configured to compose a digital image as generally described above. Specifically, in FIG. 4, the device 10 is configured to compose digital image 12 so that it is perceptible on viewing surface 14. The device 10 as shown includes an image processor 16 and a memory 18, and may further include or be connected to a detector 20, a display buffer 22, a display driver 24, or the viewing surface 14 itself.

The viewing surface 14 in some embodiments, for example, comprises the front face of a substantially transparent screen, with light incident on a back face of the screen being substantially transmitted through the screen to the front face. In these embodiments, the viewing surface 14 may be integrated into the device 10 (e.g., as a dedicated display for the device 10), or may be connected to the device 10 as an external accessory (e.g., as part of a heads-up display accessory). In other embodiments, the viewing surface 14 is a substantially opaque surface, such as the wall of a building or a piece of paper, that diffusely reflects or absorbs most or all light incident thereon. In these embodiments, the viewing surface 14 may not be connected to the device 10 at all.

In any case, the image processor 16 is configured to evaluate light reflected from, or transmitted through, the viewing surface 14. To assist the image processor 16 perform the evaluation, the detector 20 directly or indirectly provides the processor 16 with information 19 about this light. In some embodiments, for example, the detector 20 comprises a camera that directly captures one or more images of the light reflected from, or transmitted through, the viewing surface 14 (e.g., like that shown in FIG. 2A) and provides the processor 16 with those image(s) for evaluation.

The physical placement or mounting of such a camera may depend on whether the camera is configured to capture image(s) of the light reflected from the surface 14 or to capture image(s) of the light transmitted through the surface 14. If configured to capture image(s) of the light reflected from the surface 14 (e.g., in the case that the digital image is ultimately projected onto an opaque surface), the camera may be included in or mounted on the device 10 itself, included in or mounted on an external projection system, or exist as a stand-alone camera. In any of these cases, the camera has a field of view that includes the viewing surface 14. However, the camera's field of view may also include surfaces adjacent to the viewing surface 14, in which case the image(s) captured by the camera may include more than just the light reflected from the surface 14. If so, the image processor 14 may be configured to dynamically identify which part of the image(s) captured light reflected from the viewing surface 14, e.g., based on information about the camera's field of view relative to information about the scale of a displayed image.

By contrast, if configured to capture image(s) of the light transmitted through the surface 14, the camera may be included in, mounted on, or mounted near the surface itself. For example, in embodiments where the viewing surface 14 comprises the front face of a substantially transparent screen, with light incident on a back face of the screen being substantially transmitted through the screen to the front face, the camera may be mounted on or near the back face of the screen in order to capture image(s) of light incident on that back face. With the camera mounted in this way, the image(s) captured may nonetheless include light that is not transmitted through the screen, and/or may include light that, although transmitted through the screen, is not visible to a user through the screen (e.g., if the light is transmitted through the screen at an angle different from that at which the user views the screen). The image processor 14 in some embodiments therefore is configured to dynamically calculate which part of the image(s) captured light that was both transmitted through the screen and visible to the user, e.g., based on what angle the user views the screen.

Of course, the detector 20 need not be a camera. In other embodiments, for example, the detector 20 is a chromometer (i.e., a colorimeter) or spectrometer that provides the image processor 16 with a histogram of information about the light reflected from, or transmitted through, the viewing surface 14. In still other embodiments, the detector 20 is an orientation and position detector that provides the image processor 16 with information about the geographic position and directional orientation of the detector 20. This information may indirectly provide the processor 16 with information about the light reflected from, or transmitted through, the viewing surface 14. Indeed, in such embodiments, the image processor 16 may be configured to determine or derive image(s) of light reflected from, or transmitted through, the viewing surface 14 from image(s) previously captured at or near the geographic position indicated.

Having directly or indirectly received information about the light reflected from, or transmitted through, the viewing surface 14, the image processor 16 is configured to evaluate that light, as will be described in more detail below. The image processor 16 is then configured to compose the digital image 12 from one or more logical objects that have a spatial arrangement or coloration determined in dependence on that evaluation.

More particularly, the image processor 16 retrieves control data 17 from the memory 18, which includes executable instructions for generating the one or more logical objects of the digital image 12. The instructions may describe a hierarchy of logical objects in term of vector graphics (i.e., geometrical primitives) or raster graphics (i.e., pixel values). In either case, though, the instructions in at least one embodiment describe only one way to generate logical objects of the image 12; that is, the instructions in a sense define a nominal, or default, spatial arrangement and/or coloration of the logical objects that is not based on evaluation of light reflected from, or transmitted through, the viewing surface 14. Thus, in these embodiments, the image processor 16 is configured to selectively deviate from, or even modify, the retrieved instructions in order to generate the logical objects with a spatial arrangement and/or coloration that is indeed based on such evaluation, as described above. The particular manner in which the image processor 16 deviates from, or modifies, the instructions may be specified beforehand in pre-determined rules or dynamically on an image-by-image basis. Having deviated from and/or modified those instructions to generate the logical objects, the image processor 16 may then flatten the logical objects to form the digital image 12.

In other embodiments, though, the instructions describe several possible ways to generate logical objects of the image 12, e.g., without substantially affecting the meaning conveyed by the image 12. The instructions may, for example, describe that a button may be placed in either the lower-left corner of the image 12, or the lower-right corner of the image 12, and may be either red, green, or blue. In such embodiments, the image processor 16 is configured to assess the perceptibility of a logical object for each possible way to generate that logical object, based on evaluation of the viewing surface 14. The image processor 16 may then select between those possibilities in order to meet some criteria with regard to the image's perceptibility (e.g., maximum perceptibility) and generate the logical object with the selected possibility. Having generated all logical objects of the image 12 in this way, the image processor 16 may again flatten the logical objects to form the digital image 12.

With this image 12 composed, the image processor 16 is configured to then output the composed digital image 12 as digital data for display on the viewing surface 14. In particular, the image processor 16 outputs the image 12 to the display buffer 22. The display driver 24 then retrieves the digital image 12 from the display buffer 22 and displays the image 12 on the viewing surface 14. In some embodiments, for example, the display driver 24 is part of a projection system (either internal or external to the device itself) and thus projects the image 12 onto the viewing surface 14. In other embodiments, though, the display driver 24 is the driver for a substantially transparent screen, in which case the driver 24 simply displays the image 12 onto the screen.

Referring now to FIGS. 5A-5D, these figures illustrate additional details concerning the image processor's evaluation of light reflected from, or transmitted through, the viewing surface 14, according to various embodiments. In particular, in these embodiments the image processor 16 evaluates that light on a region-by-region basis. That is, the image processor 16 conceptually "subdivides" the viewing surface 14 into different regions and then separately evaluates the light in each different region. The image processor 16 may, for instance, determine, for each individual region, the extent to which the region contrasts with one or more different colors, and/or the color variance in the region.

In the example shown in FIG. 5A, the image processor 16 has subdivided the viewing surface 14 into a number of different non-overlapping rectangular regions (though the regions may be of any shape and may in fact overlap). For ease of illustration, these regions are indexed by a row letter (A, B, or C) and a column number (0, 1, 2, or 3). For each of these regions, the image processor 16 determines the extent to which the region contrasts with one or more different colors, e.g., green and purple. As shown in FIGS. 5B and 5C, for instance, the image processor 16 determines that the color of the light reflected from, or transmitted through, regions A0, A1, A2, B2, C2, and C3 is white and that therefore these regions contrast quite well with both green and purple. With respect to regions B0, B1, C0, and C1, though, the image processor 16 determines that the color of light reflected from, or transmitted through, those regions is primarily green and that therefore the regions contrast well with purple, but not green. Similarly, the color of light reflected from, or transmitted through, regions A3 and B3 is black and blue, respectively, which contrasts moderately with green, but not at all with purple. Such relationships between different colors, i.e., whether or not a certain color contrasts well with another color, may be stored as a look-up table in memory 18 or computed by the processor 16 on the fly. Furthermore, although not shown, the image processor 16 may determine the extent to which the regions of the surface 14 contrast with additional colors.

The image processor 16 in this example also determines the color variance in each region. The color variance in a region simply describes how varied the colors are in that region (e.g., a region with a checkerboard color pattern would have a greater color variance than a region with a solid color). The color variance in a region may therefore be determined based on a histogram of the colors in that region. FIG. 5D illustrates histograms for determining the color variance in the regions of this example. The histograms of regions A3, B3, and C0, in particular, show that the color variance in these regions is relatively high. Similarly, the histograms of regions A2 and C1 show that the color variance in those regions is somewhat lower, while the histograms of the remaining regions show very low color variance.

After determining the extent to which each region contrasts with one or more different colors, and/or the color variance in each region, as described above, the image processor 16 may then compose the digital image 12 from one or more logical objects based on that determination. In some embodiments, for example, the image processor 16 places logical objects within the digital image 12 based on the determination, so that any given logical object will be displayed on a region of the viewing surface 14 which has higher contrast with one or more colors of the logical object than another region and/or lower color variance than another region. In the context of the running example discussed thus far, the image processor 16 may place the green YES button of FIG. 2B so that it is displayed in region B2 of the surface 14. FIGS. 5B and 5D show this region B2 has higher contrast with the green color of the YES button than other regions and further has lower color variance than other regions.

Of course, while FIGS. 5B and 5D illustrate color contrast and variance in qualitative terms for ease of illustration, the image processor 16 may quantify these values for determining the particular placement of a logical object like the green YES button. The image processor 16 may, for instance, quantify the extent to which regions of the surface 14 contrast with one or more colors in terms of contrast metrics, and compare the contrast metrics to determine the region which has the highest contrast with those color(s). Similarly, the image processor 16 may quantify the color variance in the regions of the surface 14 as a variance metric, and compare the variance metrics to determine the region which has the lowest color variance. Finally, the image processor 16 may quantify the extent to which a region contrasts with one or more colors and the color variance in that region as a joint metric. Such a joint metric may be based upon, for example, a weighted combination of one or more contrast metrics for the region and a variance metric for the region. The image processor 16 may then compare the joint metrics to determine the region that offers the best perceptibility as indicated by the joint metric for that region.

In some cases, one region (e.g., a white region) may offer the best perceptibility for multiple logical objects of the image 12, meaning that without constraint the above image processing might place multiple logical objects on top of each other. Thus, the image processor 16 in some embodiments also takes other considerations into account when placing a logical object like the green YES button, such as the placement of other logical objects, e.g., the red NO button and the Delete text box. In this regard, the image processor 16 may be configured to jointly place multiple logical objects within the digital image 12, to provide for perceptibility of the image 12 as a whole rather than for any one logical object.

In other embodiments, the image processor 16 may not place logical objects within the digital image based on determination of the color contrast and/or color variance in each region. Rather, in these embodiments, the logical objects' placement is set in some other way, and the image processor 16 instead selects color(s) for the objects based on the determination. Thus, for any given logical object otherwise placed, the image processor 16 selects one or more colors for the object that have higher contrast with a region of the viewing surface 14 onto which the logical object will be displayed than other possible colors. Again in the context of the discussed example, the YES button of FIG. 2B may be otherwise placed within the digital image 12 to display on region B1 of the surface 14. Given this placement, the image processor 16 may select purple for the YES button because, as FIG. 5C shows, that color has a higher contrast with region B1 than other possible colors, e.g., green or blue.

Of course, for ease of illustration an assumption has been made in this example, namely that the color properties determined for each region (i.e., the color contrast and variance in FIGS. 5B-5D) are not tainted or masked by colors the device 10 itself might display on the surface 14. Consider, for example, embodiments where the surface 14 is an opaque surface and the device 10 ultimately projects colors (e.g., the digital image 12) onto that surface. If the detector 20 was to capture an image of the light reflected from the surface 14 when the device 10 was projecting something onto the surface, any color properties determined directly from that image would be tainted or masked by the colors the device 10 projected.

Accordingly, in some of these embodiments, the detector 20 is instead configured to capture an image of the light reflected from the surface 14 when the device 10 is not projecting anything on the surface 14 (e.g., during initialization or calibration of the device 10). Provided with this image, the image processor 16 may directly identify the color(s) of light reflected from each region of the surface 14 and determine the color properties of those regions. The image processor 16 may, for example, identify a color in a region and then compute or look-up in a table which colors contrast well with that color, e.g., by inverting the bits in an RGB representation of the color or selecting the contrasting color to be either black or white depending on which has the largest distance from the color.

Alternatively, instead of identifying a color in a region and computing/looking up contrasting colors, the image processor 16 may determine contrasting colors using a second image. Specifically, to determine whether a certain, pre-determined color contrasts with a region, the device 10 may project that color onto the surface 14, capture an image of the light reflected from the surface 14 with the color projected on it, and then compare this second image with the first image (the one of the light reflected from the surface 14 without anything projected on it). If the second image shows the pre-determined color as being present in the region, but the first image does not, then the device 10 determines that the color does indeed contrast well with that region. FIGS. 6A-6C illustrate an example of this.

In FIG. 6A, the detector 20 captured a first image of the light reflected from the viewing surface 14 when the device 10 was not projecting anything on the surface 14. In FIG. 6B, the detector 20 captured a second image of the light reflected from the surface 14, this time when the device 10 was projecting a pre-determined color onto the surface 14, green. The image processor 16 then compares these two images to assess the perceptibility of the color green as viewed on the viewing surface 14. In particular, the image processor 16 compares the images to determine whether the color green contrasts well with different regions of the surface 14. Consider, for instance, region B2 of the surface 14. Because the second image in FIG. 6B shows the color green as being present in region B2, but the first image in FIG. 6A does not, the image processor determines that the color green contrasts well with region B2, as shown in FIG. 6C. On the other hand, because both the first and second images show the color green as being present in region B1, the image processor 16 determines that the color green does not contrast well with region B1.

Note that while the above example indicated that both the first and second images were captured by the detector 20 in order to assess the perceptibility of a pre-determined color, in some embodiments only one of those images is actually captured. The other image can be estimated or otherwise derived from the one captured, such as by digitally adding or subtracting the pre-determined color to/from the captured image. The detector 20 may, for instance, capture the first image in FIG. 6A, whereupon the image processor 16 derives the second image in FIG. 6B from that first image by digitally adding the color green to the first image. Alternatively, the detector 20 may capture the second image in FIG. 6B, whereupon the image processor 16 derives the first image in FIG. 6A by digitally subtracting the color green from the second image. The image processor 16 may then compare the two images as previously discussed. Or, instead of comparing the two images, the image processor 16 may simply use the first image, as estimated from the second image, to compute or look up contrasting colors as previously discussed.

These approaches of course work well for an initial evaluation of the surface 14, e.g., during initial setup of the device 10. However, because the approaches contemplate either not projecting anything on the surface 14, or projecting only pre-determined colors on the surface 14, the approaches do not work as well for continuous or dynamic evaluation of the surface 14 as the digital image 12 is being projected. Such dynamic evaluation of the surface 14 may indicate changes in the surface 14 and/or movement of the device 10, and thus permit the image processor 16 to dynamically update composition of the digital image 12 for improved perceptibility. Nonetheless, concepts from these approaches may be extended to alternatively or additionally provide for dynamic evaluation of the surface 14.

In particular, the detector 20 in some embodiments may be configured to capture an image of the light reflected from the surface 14 even as the device 10 is projecting the digital image 12 onto the surface 14. The image processor 16 may then digitally subtract the digital image 12 from this captured image, and thereby derive an estimated image of light that would have been reflected from the surface 14 had the device 10 not been projecting anything onto the surface 14. Correspondingly, the image processor 16 may compare the captured image with the estimated image to assess the perceptibility of the digital image 12, or use the estimated image to compute or look up contrasting colors as previously discussed.

FIGS. 7A-7E illustrate a simple example of still other embodiments where the image processor 16 dynamically evaluates the surface 14. In these embodiments, the image processor 16 is configured to evaluate light reflected from portions of the surface 14 that are immediately adjacent to the portions where the digital image 12 is being projected, and to update composition of the digital image 12 if and when the digital image 12 is projected onto those adjacent portions.

Figure 7C:
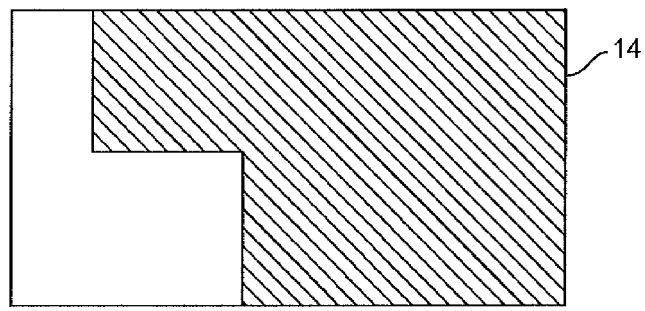
Figure 7C:
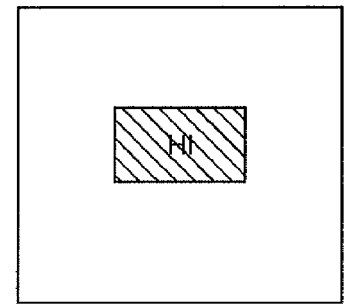
Figure 7C:
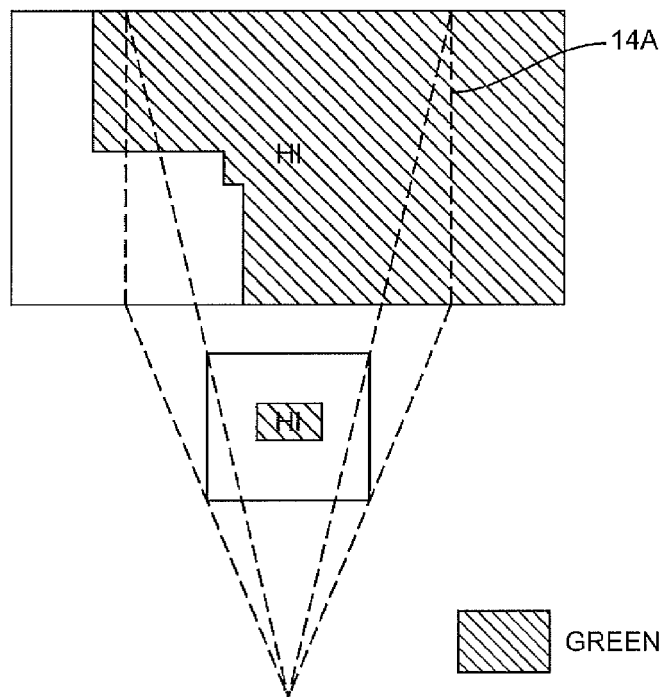
Figure 7D:
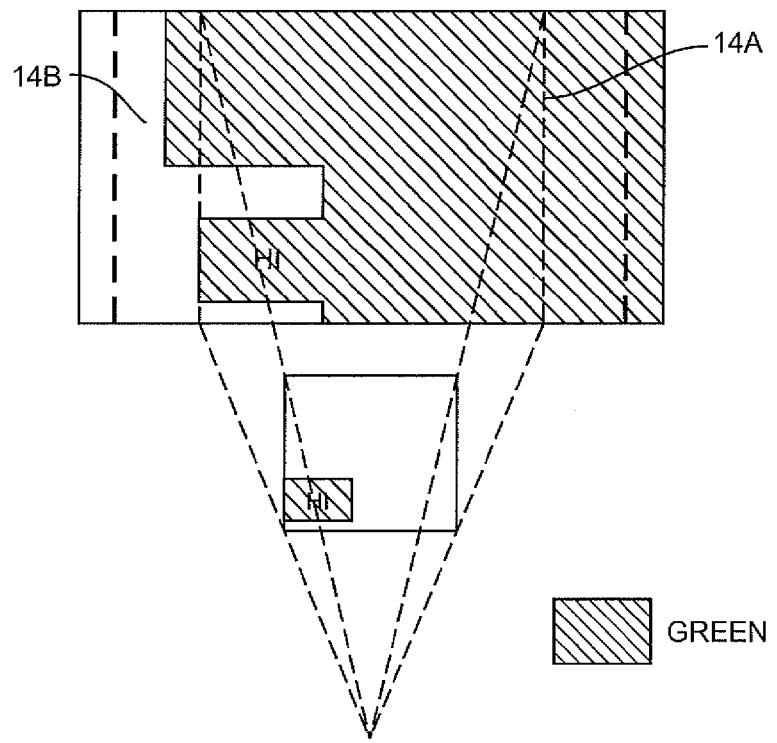
Figure 7E:
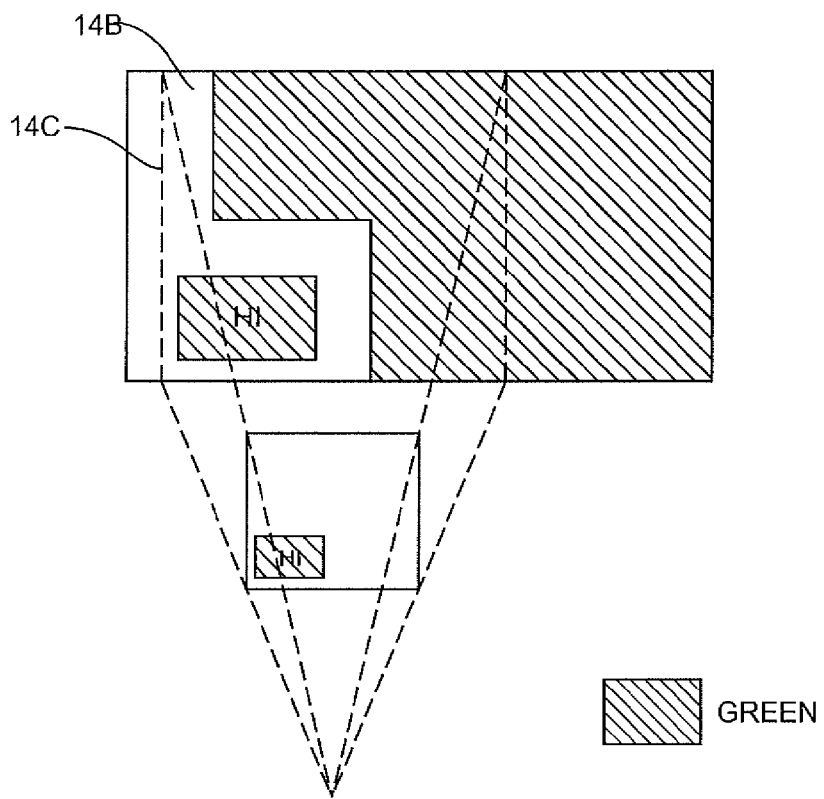

FIG. 7A, for example, illustrates a viewing surface 14 that is wider than the digital image 12 in FIG. 7B that is to be projected onto it. The digital image 12 in FIG. 7B consists of a single logical object, a green HI text box nominally positioned in the center of the image 12. If projected onto a first portion 14A of the surface 14 with the HI text box nominally positioned in this way, the text box would not be very perceptible against the mostly green surface 14, as shown in FIG. 7C. As shown in FIG. 7D, though, the image processor 16 may place the HI text box as far as possible into the lower-left corner of the image 12, so that it will be projected on a region of the surface 14 (or actually, on a region of the first portion 14A of the surface 14) which has higher contrast with the green color of the text box. This region of the surface 14, though, may not be large enough to display the entire HI text box, such that the right side of the text box is still difficult to perceive.

Nonetheless, while the device 10 is projecting the image 12 onto the first portion 14A of the surface 14, the detector 20 is configured to capture an image of the light reflected from the surface 14, including light reflected from a portion 14B immediately adjacent to the first portion 14A. Provided with this image, the image processor 16 may determine that the portion 14B is immediately adjacent to the HI text box and that, given the discrepancy between the color of the light reflected from portion 14B and the known color of the text box, portion 14B contrasts well with the green color of the text box.

Thus, responsive to detecting a spatial shift from projecting the digital image 12 onto the first portion 14A to projecting the image 12 onto a second portion 14C that includes portion 14B, the image processor 16 is configured to update composition of the image 12. Such composition may be based on the processor's previous evaluation of light reflected from portion 14B, rather than any subsequent evaluation that may disrupt display of the image 12 or require additional processing. In the context of the example, the image processor 12 may adjust placement of the HI text box so that it is no longer as far left as possible in the corner of the image 12, based on the processor's previous evaluation of portion 14B.

Although much of the immediately preceding discussion has focused on embodiments where the surface 14 is an opaque surface and the device 10 projects the digital image 12 onto that surface, many of the concepts can easily be extended to embodiments where the surface 14 is instead a transparent surface. Of course, in these embodiments, the detector 20 may be mounted on or near the back face of the screen. So mounted, the detector 20 may capture an image of the light transmitted through the surface, without any regard to what the device 10 might be displaying on the screen. Accordingly, even if the detector 20 were to capture this image when the device was projecting something on the screen, the image processor 16 may determine color properties of different regions of the surface 14 directly from the image without taint from the colors displayed by the device 10.

Thus, in embodiments where the surface 14 is a transparent surface, the image processor 16 may evaluate light transmitted through the screen simply by obtaining an image of that light, directly identifying the color(s) of light transmitted through each region of the surface 14, and determining the color properties of those regions. The image processor 16 may, for example, identify a color in a region and then compute or look-up in a table which colors contrast well with that color, e.g., by inverting the bits in an RGB representation of the color or selecting the contrasting color to be either black or white depending on which has the largest distance from the color. As the image processor 16 may do this even while the digital image 12 is being displayed on the screen, such works well for both initial evaluation and dynamic evaluation of the surface 14.

Alternatively, instead of identifying a color in a region and computing/looking up contrasting colors, the image processor 16 may determine contrasting colors using a second image. To determine whether a certain, pre-determined color contrasts with a region, the device 10 may derive a second image by digitally adding the pre-determined color to the first image (the one of light transmitted through the screen) and then compare the two images as previously discussed with respect to other embodiments. Or, to assess the perceptibility of the digital image or logical objects, the device 10 may derive a second image by digitally adding the digital image 12 or logical objects to the first image and then comparing the two images.

Those skilled in the art will of course appreciate that the above description has merely presented various non-limited examples. For instance, as discussed above, the image processor 16 may be configured to select color(s) for a logical object based simply on whether those color(s) have a higher contrast with a region of the viewing surface 14 onto which the object will be displayed than other possible colors. This selection, however, may be based on other criteria as well. Consider FIGS. 8A-8E.

Figure 8A:
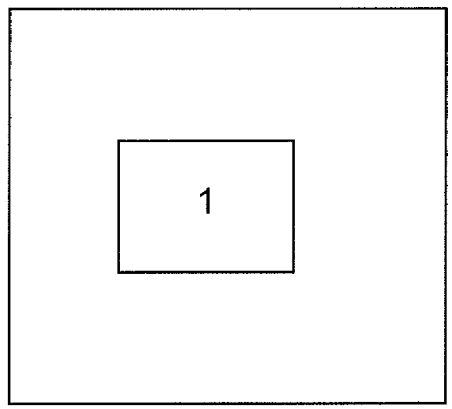
FIGS. 8A-8E illustrate an example of composing a digital image based on layering logical objects, according to some embodiments of the present invention.
Figure 8B:
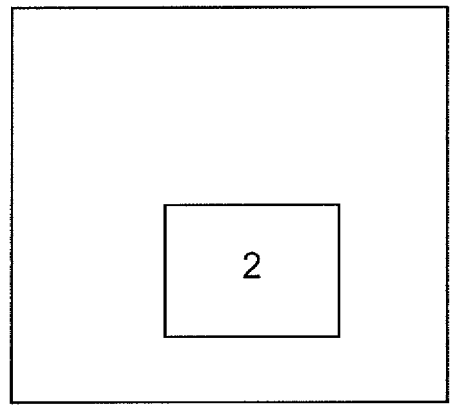
Figure 8C:
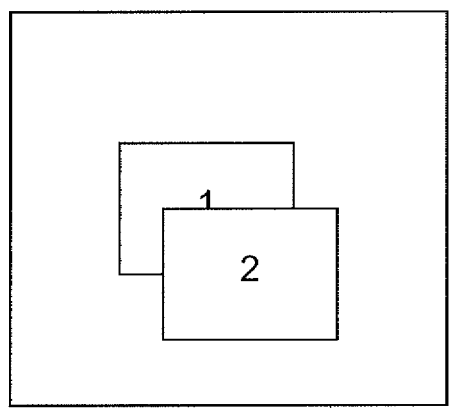
Figure 8D:
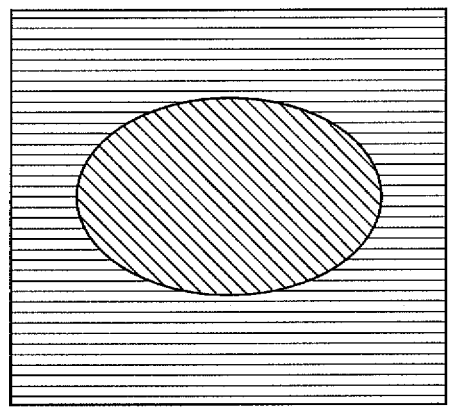
Figure 8D:
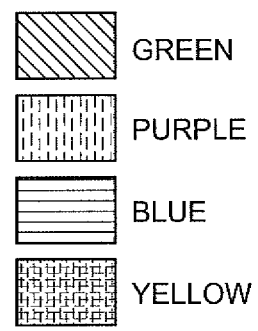

FIGS. 8A-8C illustrate that a digital image 12 may be composed from a hierarchy of logical objects, which are layered on top of one another and flattened to form the image 12. The digital image shown in FIG. 8C, for example, is composed by layering logical object 2 from FIG. 8B on top of logical object 1 from FIG. 8A. In this regard, the image processor 16 may be configured to determine a coloration for logical object 2 based at least in part on that coloration having a higher contrast with the coloration of logical object 1 than other possible colorations.

Figure 8E:
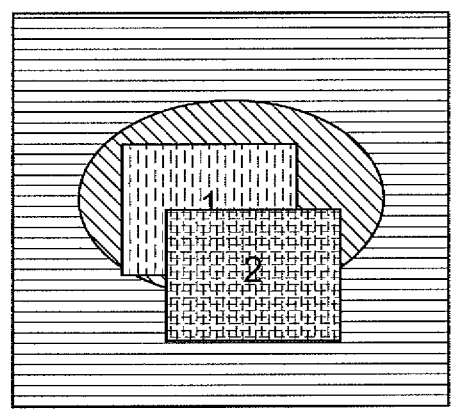

In the example, the viewing surface 14 includes a green circle surrounded by blue. Logical objects 1 and 2 are layered on top of one another and placed as shown in FIG. 8E. The image processor 16 selects the color purple for logical object 1 based on that color having a higher contrast with the green circle on top of which it is displayed than other possible colors. Then, rather than basing its selection of the color for logical object 2 solely based on the object being displayed on top of part of the green circle as well, the image processor 16 selects the color yellow for logical object 2 based on that color having a higher contrast with the purple color of logical object 1 than other possible colors.

Furthermore, the various embodiments presented herein have been generally described as providing for the perceptibility of a digital image 12 on a viewing surface 14. One should note, though, that the perceptibility provided for is not necessarily tailored to any particular user's perception of color. Rather, the perceptibility provided for is some pre-determined, objective perceptibility provided according to pre-determined thresholds of perceptibility and color relationships.

Those skilled in the art will also appreciate that the device 10 described herein may be any device configured to prepare a digital image for display on a viewing surface (whether or not the surface is integrated with or external to the device). Thus, the device 10 may be a mobile communication device, such as a cellular telephone, personal data assistant (PDA), or the like. In any event, the device may be configured in some embodiments to prepare a digital image for display on a substantially transparent screen integrated with the device itself, or on an external transparent screen communicatively coupled to the device (e.g., a heads-up display). A heads-up display as used herein includes any transparent display that presents data without requiring the user to look away from his or her usual viewpoint. This includes both head- and helmet-mounted displays that moves with the orientation of the user's head, as well as fixed displays that are attached to some frame (e.g., the frame of a vehicle or aircraft) that does not necessarily move with the orientation of the user's head. The device may alternatively be configured to prepare a digital image for projection on a substantially opaque surface, e.g., using a projection system integrated with or external to the device.

Those skilled in the art will further appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of composing a digital image to provide for perceptibility of the image on a viewing surface, the method implemented by an image processor and comprising:
    evaluating light reflected from, or transmitted through, the viewing surface;
    composing the digital image from one or more logical objects having a spatial arrangement or coloration determined in dependence on said evaluation; and
    outputting the composed digital image as digital data for display on the viewing surface.

2. The method of claim 1, wherein said composing the digital image comprises placing any given logical object at a position within the digital image that will be displayed on a region of the viewing surface which, according to said evaluation, has at least one of:
    higher contrast with one or more colors of the logical object than another region; and
    lower color variance than another region.

3. The method of claim 1, wherein said composing the digital image comprises selecting one or more colors for any given logical object that, according to said evaluation, have higher contrast with a region of the viewing surface onto which the logical object will be displayed than other possible colors.

4. The method of claim 1, wherein-said composing the digital image comprises:

for different positions in a set of possible positions of a given logical object within the digital image, and for different colors in a set of possible colors for the object, determining a perceptibility for the object if placed at that position and colored with that color;

determining a position and color for the object that either maximizes the object's perceptibility or offers at least a pre-determined perceptibility; and placing the object at that position, and selecting that color for the object.

5. The method of claim 1, wherein said evaluation comprises evaluating light reflected from, or transmitted through, different regions of the viewing surface and determining, for each region, at least one of:

the extent to which the region contrasts with one or more different colors; and the color variance in the region.

6. The method of claim 1, wherein said evaluation comprises obtaining two different images of light reflected from, or transmitted through, the viewing surface, one image being with, and the other image being without, a pre-determined color or the digital image itself having been displayed on the surface.

7. The method of claim 6, wherein said obtaining comprises:

obtaining a first one of the two different images; and obtaining a second one of the two different images by deriving it from the first one, the derivation including either:

digitally adding the pre-determined color or the digital image itself to the first one; or digitally subtracting the pre-determined color or the digital image itself from the first one.

8. The method of claim 6, wherein said evaluation further comprises either:

comparing the images to determine the extent to which the pre-determined color or the digital image itself contrasts with the viewing surface; or identifying a color in the image without a pre-determined color or the digital image itself having been displayed on the surface and computing or looking up in a look up table one or more colors that contrast with that identified color.

9. The method of claim 1, wherein the digital image is projected onto a first portion of the viewing surface, and wherein the method further comprises:

evaluating light reflected from a portion of the surface that is immediately adjacent to the first portion;

detecting a spatial shift from projecting the digital image onto the first portion to projecting the digital image onto a second portion that includes said adjacent portion; and responsive to said detection, updating composition of the digital image based on the evaluation of light reflected from said adjacent portion.

10. The method of claim 1, wherein said composing the digital image comprises:

layering a first logical object underneath a second logical object;

determining a coloration for the second logical object based at least in part on that coloration having higher contrast with the coloration of the first logical object than other possible colorations; and flattening the first and second logical objects to form a flattened digital image.

11. The method of claim 1, wherein the viewing surface comprises a front face of a substantially transparent screen, with light incident on a back face of the screen substantially transmitted through the screen to the front face, and wherein evaluating light transmitted through the viewing surface comprises evaluating light incident on the back face of the screen.

12. The method of claim 1, wherein the digital image comprises a user interface and wherein composing the digital image from one or more logical objects comprises composing the digital image from one or more user interface objects.

13. A device configured to compose a digital image to provide for perceptibility of the image on a viewing surface, the device including an image processor configured to:

evaluate light reflected from, or transmitted through, the viewing surface;

compose the digital image from one or more logical objects having a spatial arrangement or coloration determined in dependence on said evaluation; and output the composed digital image as digital data for display on the viewing surface.

14. The device of claim 13, wherein the image processor is configured to compose the digital image by placing any given logical object at a position within the digital image that will be displayed on a region of the viewing surface which, according to said evaluation, has at least one of:

higher contrast with one or more colors of the logical object than another region; and lower color variance than another region.

15. The device of claim 13, wherein the image processor is configured to compose the digital image by selecting one or more colors for any given logical object that, according to said evaluation, have higher contrast with a region of the viewing surface onto which the logical object will be displayed than other possible colors.

16. The device of claim 13, wherein the image processor is configured to compose the digital image by:

for different positions in a set of possible positions of a given logical object within the digital image, and for different colors in a set of possible colors for the object, determining a perceptibility for the object if placed at that position and colored with that color;

determining a position and color for the object that either maximizes the object's perceptibility or offers at least a pre-determined perceptibility; and placing the object at that position, and selecting that color for the object.

17. The device of claim 13, wherein the image processor is configured to evaluate light reflected from, or transmitted through, different regions of the viewing surface and to determine, for each region, at least one of:

the extent to which the region contrasts with one or more different colors; and the color variance in the region.

18. The device of claim 13 wherein the image processor is configured to evaluate light reflected from, or transmitted through, the viewing surface by obtaining two different images of the light reflected from, or transmitted through, the viewing surface, one image being with, and the other image being without, a pre-determined color or the digital image itself having been displayed on the surface.

19. The device of claim 18, wherein the image processor is configured to obtain the two different images by:
obtaining a first one of the two different images; and
obtaining a second one of the two different images by deriving it from the first one, the derivation including either:
adding the pre-determined color or the digital image itself to the first one; or
subtracting the pre-determined color or the digital image itself from the first one.

20. The device of claim 18, wherein the image processor is configured to evaluate light reflected from, or transmitted through, the viewing surface further by either:
comparing the images to determine the extent to which the pre-determined color or the digital image itself contrasts with the viewing surface; or
identifying a color in the image without a pre-determined color or the digital image itself having been displayed on the surface and computing or looking up in a look up table one or more colors that contrast with that identified color.

21. The device of claim 13, wherein the digital image is projected onto a first portion of the viewing surface, and wherein the image processor is further configured to:
evaluate light reflected from a portion of the surface that is immediately adjacent to the first portion;
detect a spatial shift from projecting the digital image onto the first portion to projecting the digital image onto a second portion that includes said adjacent portion; and
responsive to said detection, update composition of the digital image based on the evaluation of light reflected from said adjacent portion.

22. The device of claim 13, wherein the image processor is configured to compose the digital image from one or more logical objects by:
layering a first logical object underneath a second logical object;
determining a coloration for the second logical object based at least in part on that coloration having higher contrast with the coloration of the first logical object than other possible colorations; and
flattening the first and second logical objects to form a flattened digital image.

23. The device of claim 13, wherein the viewing surface comprises a front face of a substantially transparent screen, with light incident on a back face of the screen substantially transmitted through the screen to the front face, and wherein the image processor is configured to evaluate light transmitted through the viewing surface by evaluating light incident on the back face of the screen.

24. The device of claim 13, wherein the digital image comprises a user interface of the device and wherein the image processor is compose the digital image from one or more user interface objects.

* * * * *